United States Patent
Koo et al.

(10) Patent No.: US 11,398,348 B2
(45) Date of Patent: Jul. 26, 2022

(54) ELECTRONIC COMPONENT AND METHOD FOR MANUFACTURING THE SAME

(71) Applicant: SAMSUNG ELECTRO-MECHANICS CO., LTD., Suwon-si (KR)

(72) Inventors: Kun Hoi Koo, Suwon-si (KR); Soung Jin Kim, Suwon-si (KR); Bon Seok Koo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 35 days.

(21) Appl. No.: 17/022,518

(22) Filed: Sep. 16, 2020

(65) Prior Publication Data
US 2021/0375543 A1 Dec. 2, 2021

(30) Foreign Application Priority Data
Jun. 2, 2020 (KR) .................. 10-2020-0066276

(51) Int. Cl.
*H01G 4/248* (2006.01)
*H01G 4/12* (2006.01)
*H01G 4/30* (2006.01)

(52) U.S. Cl.
CPC .............. *H01G 4/12* (2013.01); *H01G 4/248* (2013.01); *H01G 4/30* (2013.01)

(58) Field of Classification Search
None
See application file for complete search history.

(56) References Cited

U.S. PATENT DOCUMENTS

| 10,319,527 | B2* | 6/2019 | Kim | H01G 4/12 |
| 10,446,320 | B2* | 10/2019 | Kim | H01G 4/30 |
| 10,658,116 | B2* | 5/2020 | Kim | H01G 4/2325 |
| 10,770,230 | B2* | 9/2020 | Koo | H01G 4/30 |
| 10,770,234 | B2* | 9/2020 | Kim | H01G 4/12 |
| 2007/0242416 | A1* | 10/2007 | Saito | H01G 4/2325 |
| | | | | 361/321.1 |
| 2013/0106560 | A1* | 5/2013 | Zenzai | H01F 17/0013 |
| | | | | 336/233 |
| 2015/0090483 | A1* | 4/2015 | Moon | H01G 4/30 |
| | | | | 174/260 |
| 2015/0279563 | A1* | 10/2015 | Otani | H01G 4/008 |
| | | | | 361/301.4 |
| 2017/0032896 | A1* | 2/2017 | Otani | H01G 4/232 |
| 2017/0178811 | A1* | 6/2017 | Chun | H01G 4/2325 |
| 2018/0166215 | A1* | 6/2018 | Hamanaka | H01G 4/232 |

(Continued)

FOREIGN PATENT DOCUMENTS

| JP | 2013-118358 A | 6/2013 |
| KR | 10-2019-0044036 A | 4/2019 |

*Primary Examiner* — Dion R. Ferguson
(74) *Attorney, Agent, or Firm* — Morgan, Lewis & Bockius LLP

(57) ABSTRACT

An electronic component includes a body, including a dielectric layer and an internal electrode, and an external electrode including a conductive resin layer, disposed on the body, and a plating layer disposed on the conductive resin layer. The conductive resin layer includes a metal particle, a first intermetallic compound, and a base resin, and a second intermetallic compound is disposed on a boundary between the conductive resin layer and the plating layer.

20 Claims, 5 Drawing Sheets

(56) References Cited

U.S. PATENT DOCUMENTS

| | | | |
|---|---|---|---|
| 2018/0286594 A1* | 10/2018 | Kim | H01G 4/12 |
| 2019/0013150 A1* | 1/2019 | Koo | H01G 4/2325 |
| 2019/0295773 A1* | 9/2019 | Kim | H01G 4/30 |
| 2020/0176189 A1* | 6/2020 | Koo | H01G 4/2325 |
| 2021/0057153 A1* | 2/2021 | Jun | H01G 4/232 |
| 2021/0074481 A1* | 3/2021 | Yi | H01G 4/012 |
| 2021/0183561 A1* | 6/2021 | Yang | H01F 27/29 |
| 2021/0375543 A1* | 12/2021 | Koo | H01G 4/248 |

* cited by examiner

ELECTRONIC COMPONENT AND METHOD FOR MANUFACTURING THE SAME

CROSS-REFERENCE TO RELATED APPLICATION(S)

This application claims the benefit under 35 USC 119 (a) of Korean Patent Application No. 10-2020-0066276 filed on Jun. 2, 2020 in the Korean Intellectual Property Office, the entire disclosure of which is incorporated herein by reference for all purposes.

BACKGROUND

1. Field

The present disclosure relates to an electronic component and a method for manufacturing the same.

2. Description of Related Art

With the recent trend for miniaturization and high performance in electronic devices, passive components have also been required to be miniaturized and to have high reliability.

Electronic components include passive components such as capacitors, inductors, resistors, and the like. In general, a passive component includes an external electrode to be connected to an external circuit.

A technique of applying a conductive resin layer to an external electrode has been disclosed as a method of securing high reliability of passive components. According to the technique, tensile stress generated in a mechanical or thermal environment may be absorbed to prevent occurrence of cracking caused by the stress. In addition, in the case of a power inductor PI, a conductive resin layer having improved conductivity is applied due to physical properties such as DC resistance Rdc. However, a portion of the plating layer may be leached to be lost due to thermal impact from a heat source such as soldering heat.

Accordingly, there is demand for development of an electronic component having an external electrode, capable of preventing loss of a plating layer and improving reliability, and a method for manufacturing the same.

SUMMARY

An aspect of the present disclosure is to provide an electronic component having improved adhesion strength between a conductive resin layer and a plating layer and a method for manufacturing the same.

An aspect of the present disclosure is to provide an electronic component having improved lead heat resistance and a method for manufacturing the same.

An aspect of the present disclosure is to provide an electronic component having improved reliability and a method for manufacturing the same.

However, the objects of the present disclosure are not limited to the above description, and will be more easily understood in the process of describing specific embodiments of the present disclosure.

According to an aspect of the present disclosure, an electronic component includes a body, including a dielectric layer and an internal electrode, and an external electrode including a conductive resin layer, disposed on the body, and a plating layer disposed on the conductive resin layer. The conductive resin layer includes a metal particle, a first intermetallic compound, and a base resin, and a second intermetallic compound is disposed on a boundary between the conductive resin layer and the plating layer.

According to an aspect of the present disclosure, a method for manufacturing an electronic component includes preparing a body including a dielectric layer and an internal electrode, applying and drying a paste for a conductive resin layer to and on the body and then performing a curing heat treatment to forma conductive resin layer, and plating a metal material on the conductive resin layer and then performing a plating heat treatment to form a plating layer. The paste for a conductive resin layer includes a metal powder coated with a first organic material, a low-melting-point metal powder coated with a second organic material, and a base resin.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
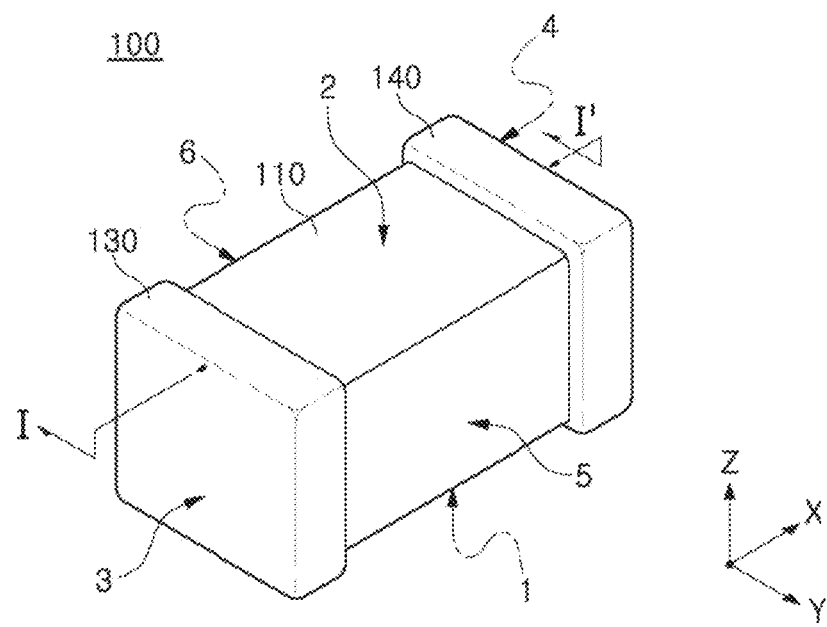
FIG. 1 is a schematic perspective view of an electronic component according to an embodiment of the present disclosure.

Hereinafter, embodiments of the present disclosure will be described with reference to specific embodiments and the accompanying drawings. However, embodiments of the present disclosure may be modified to have various other forms, and the scope of the present disclosure is not limited to the embodiments described below. Further, embodiments of the present disclosure may be provided for a more complete description of the present disclosure to the ordinary artisan. Therefore, shapes and sizes of the elements in the drawings may be exaggerated for clarity of description, and the elements denoted by the same reference numerals in the drawings may be the same elements.

A value used to describe a parameter such as a 1-D dimension of an element including, but not limited to, "length," "width," "thickness," diameter," "distance," "gap," and/or "size," a 2-D dimension of an element including, but not limited to, "area" and/or "size," a 3-D dimension of an element including, but not limited to, "volume" and/or "size", and a property of an element including, not limited to, "roughness," "density," "weight," "weight ratio," and/or "molar ratio" may be obtained by the method(s) and/or the tool(s) described in the present disclosure. The present disclosure, however, is not limited thereto. Other methods and/or tools appreciated by one of ordinary skill in the art, even if not described in the present disclosure, may also be used.

In the drawings, portions not related to the description will be omitted for clarification of the present disclosure, and a thickness may be enlarged to clearly show layers and regions. Further, throughout the specification, when an element is referred to as "comprising" or "including" an element, it means that the element may further include other elements as well, without departing from the description, unless specifically stated otherwise.

In the drawings, an X direction may be defined as a second direction, an L direction, or a longitudinal direction; a Y direction may be defined as a third direction, a W direction, or a width direction; and a Z direction may be defined as a first direction, a stacking direction, a T direction, or a thickness direction.

Electronic Component

FIG. 1 is a schematic perspective view of an electronic component according to an embodiment of the present disclosure.

Figure 2:
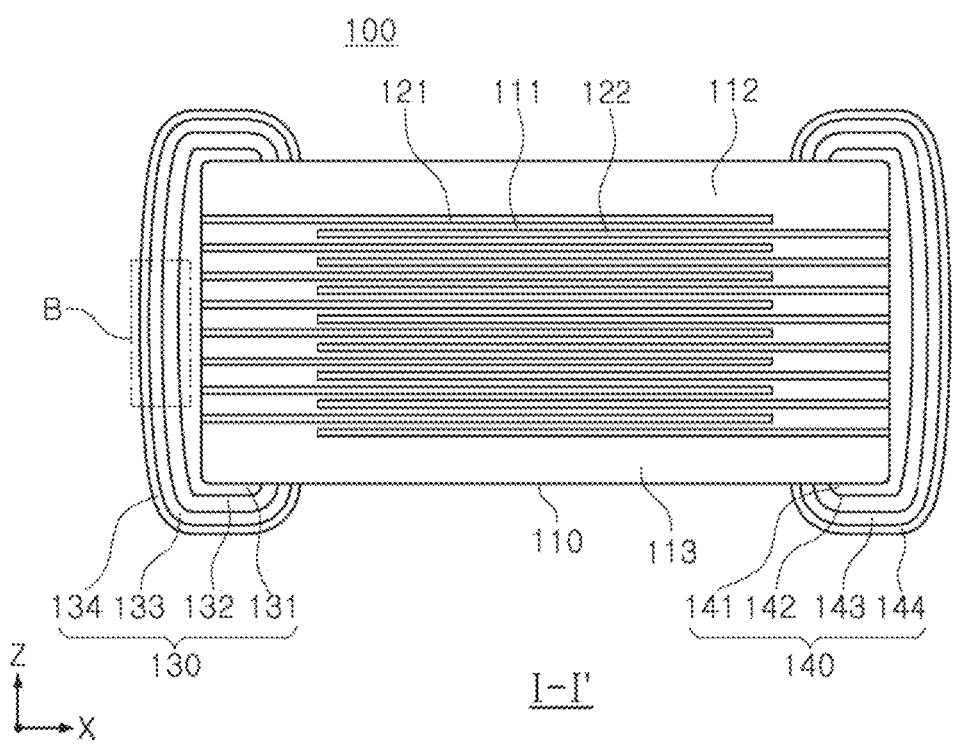
FIG. 2 is a cross-sectional view taken along line I-I' in FIG. 1.

FIG. 2 is a cross-sectional view taken along line I-I' in FIG. 1.

Figure 3:
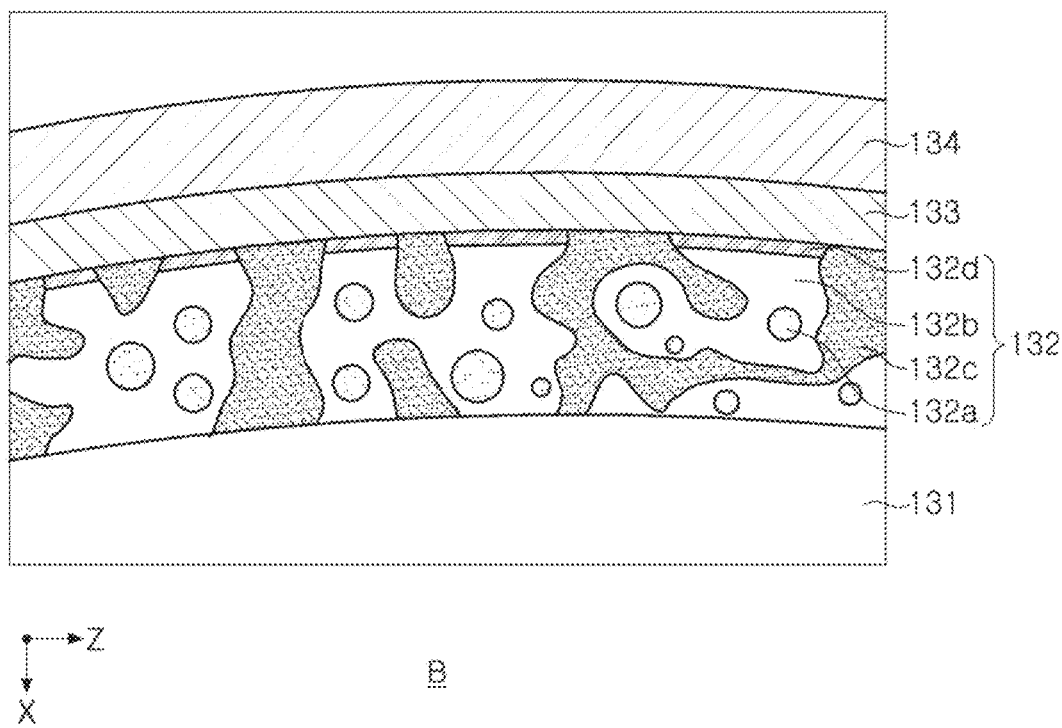
FIG. 3 is an enlarged view of region B in FIG. 2.

FIG. 3 is an enlarged view of region B in FIG. 2.

Figure 4:
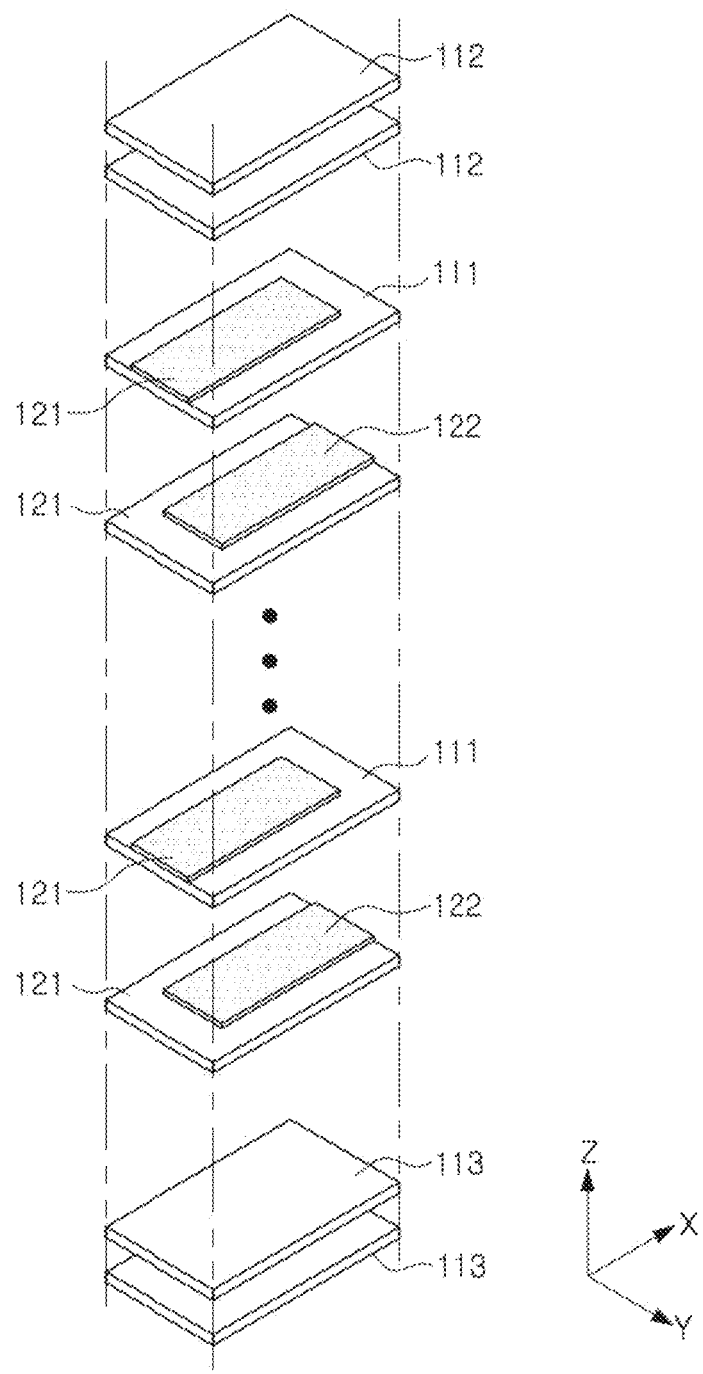
FIG. 4 is a schematic exploded perspective view of the body in FIG. 1, in which dielectric layers and internal electrodes are laminated.

FIG. 4 is a schematic exploded perspective view of the body in FIG. 1, in which dielectric layers and internal electrodes are laminated.

Hereinafter, an electronic component 100 according to an embodiment of the present disclosure will be described with reference to FIGS. 1 to 4. Also, a capacitor will be described as an example to describe an embodiment of the present invention, but the present disclosure is not limited thereto. It is noted that a capacitor may be applied to an electronic component provided with an external electrode including a conductive resin layer and a plating layer.

An electronic component 100 according to an embodiment may includes a body 110, including dielectric layers 111 and internal electrodes 121 and 122, and external electrodes 130 and 140 including conductive resin layers 132 and 142, disposed on the body 110, and plating layers 133 and 143 disposed on the conductive resin layers 132 and 142. The conductive resin layer may include a metal particle 132a, a first intermetallic compound 132b, and a base resin 132c. A second intermetallic compound 132d may be disposed on a boundary between the conductive resin layer and the plating layer.

In the body 110, the dielectric layers 111 and the internal electrodes 121 and 122 are alternately laminated.

Although a specific shape of the body 110 is not necessarily limited, as illustrated, the body 110 may have a hexahedral shape or the like. Due to shrinkage of ceramic powder particles contained in the body 110 during a sintering process, the body 110 may not have a perfectly hexahedral shape with completely straight lines, but may have a substantially hexahedral shape overall.

The body 110 may have first and second surfaces 1 and 2 opposing each other in a thickness direction (the Z direction), third and fourth surfaces 3 and 4 connected to the first and second surfaces 1 and 2 and opposing each other in a length direction (the X direction), and fifth and sixth surfaces 5 and 6 connected to the first and second surfaces 1 and 2, connected to the third and fourth surfaces 3 and 4, and opposing each other in a width direction (the Y direction).

A plurality of dielectric layers 111 forming the body 110 may be in a sintered state, and adjacent dielectric layers 111 may be integrated with each other such that boundaries therebetween are not readily apparent without using a scanning electron microscope (SEM).

According to an embodiment, a raw material for forming the dielectric layers 111 is not necessarily limited as long as sufficient capacitance may be obtained therefrom. For example, the raw material may be a barium titanate-based material, a lead composite perovskite-based material, a strontium titanate-based material, or the like. The barium titanate-based material may include $BaTiO_3$-based ceramic powder particles. Examples of the ceramic powder particles may be $(Ba_{1-x}Ca_x) TiO_3$, $Ba(Ti_{1-y}Ca_y)O_3$, $(Ba_{1-x}Ca_x)(Ti_{1-y}Zr_y)O_3$ or $Ba(Ti_{1-y}Zr_y)O_3$, or the like, in which calcium (Ca), zirconium (Zr), or the like, is partially solid-solubilized in $BaTiO_3$.

In addition to the ceramic powder particles, various ceramic additives, organic solvents, binders, dispersants, or the like, may be added as the raw material forming the dielectric layer 111, depending on the purpose of the present disclosure.

The body 110 may include a capacitance forming portion, disposed in the body 110, in which capacitance is formed, including the first and second internal electrodes 121 and 122 disposed to oppose each other with the dielectric layer 111 interposed therebetween, and an upper protection layer 112 and a lower protective layer 113, respectively disposed above and below the capacitance forming portion.

The capacitive forming portion contributes to capacitance formation of a capacitor, and may be formed by repeatedly laminating a plurality of first and second internal electrodes 121 and 122 with respective dielectric layers 111 interposed therebetween.

The upper protective layer 112 and the lower protective layer 113 may be formed by laminating one or two or more dielectric layers on upper and lower surfaces of the capacitance forming portion in a vertical direction, respectively, and may serve to prevent the first and second internal electrodes 121 and 122 from being damaged by physical or chemical stress.

The upper protective layer 112 and the lower protective layer 113 may not include an internal electrode, and may include the same material as the dielectric layer 111.

The internal electrodes may include a first electrode 121 and a second internal electrode 122. The first and second internal electrodes 121 and 122 are alternately disposed to oppose each other with respective dielectric layers 111, constituting the body 110, interposed therebetween, and may be exposed to the third and fourth surfaces 3 and 4 of the body 110, respectively.

The first internal electrode 121 may be spaced apart from the fourth surface 4 and may be exposed through the third surface 3, and the second internal electrode 122 may be spaced apart from the third surface 3 and may be exposed through the fourth surface 4.

In this case, the first and second internal electrodes 121 and 122 may be electrically separated from each other by respective dielectric layers 111 interposed therebetween.

Referring to FIG. 4, the body 110 may be formed by alternately laminating a ceramic green sheet, on which the first internal electrode 121 is printed, and a ceramic green sheet, on which the second internal electrode 122 is printed, and then sintering the laminated ceramic green sheets.

A material for forming the internal electrodes 121 and 122 is not necessarily limited, and a material having improved electrical conductivity may be used. For example, the internal electrodes 121 and 122 may be formed by printing a conductive paste for the internal electrodes including at least one of nickel (Ni), copper (Cu), palladium (Pd), silver (Ag), gold (Au), platinum (Pt), tin (Sn), tungsten (W), titanium (Ti), or alloys thereof, on the ceramic green sheet.

A screen-printing method, a gravure printing method, or the like, may be used as a printing method of the conductive paste for the internal electrodes, but the present disclosure is not limited thereto.

The external electrodes 130 and 140 may be disposed on the body 110 and connected to the internal electrodes 121 and 122, respectively. In addition, the external electrodes may include first and second external electrodes 130 and 140, respectively disposed on the third and fourth surfaces 3 and 4 of the body 110 to be connected to the first and second internal electrodes 121 and 122, respectively.

Although the structure, in which the electronic component 100 includes two external electrodes 130 and 140, has been described in this embodiment, the number, shape, and the like, of the external electrodes 130 and 140 may vary depending on the shape of the internal electrodes 121 and 122 or other purposes.

The external electrodes 130 and 140 include conductive resin layers 132 and 142, disposed on the body 110, and plating layers 133 and 143 disposed on the conductive resin layer 132 and 142, respectively.

FIG. 3 is an enlarged view of region B in FIG. 2.

The region B is illustrated by enlarging a portion of the first external electrode 130, but has configurations of the first and second external electrodes 130 and 140 are similar to each other except that the first external electrode 130 is electrically connected to the first internal electrode 121 and the second external electrode 140 is connected to the second internal electrode 122. Therefore, hereinafter, a description will be given based on the first external electrode 130, but the description is considered to include the description of the second external electrode 140.

The conductive resin layer 132 includes metal particles 132$a$, a first intermetallic compound 132$b$, and a base resin 132$c$. The conductive resin layer 132 may serve to electrically connect the plating layer 133 and the internal electrode 121 to each other and may absorb tensile stress, generated in a mechanical or thermal environment when an electronic component is mounted on a substrate, to prevent cracking from occurring and to protect a multilayer ceramic capacitor from bending impact of the substrate.

The metal particle 132$a$ may include at least one of silver (Ag) copper (Cu), or a mixture thereof and may include, in more detail, Ag.

The first intermetallic compound 132$b$ may be disposed to surround a plurality of metal particles 132$a$ when a low-melting-point metal and the metal particle 132$a$ are in a molten state during drying and curing heat treatment to produce the conductive resin layer 132, and thus, may serve to connect the plurality of metal particles 132$a$ to each other. In addition, the first intermetallic compound 132$b$ may significantly reduce stress in the body 110 and may improve high-temperature load and moisture-resistance characteristics.

In this case, the first intermetallic compound 132$b$ may be a material different from the second intermetallic compound 132$d$. The first intermetallic compound 132$b$ may be an intermetallic compound between a low-melting-point metal and the metal particle 132$a$.

As will be described later, the conductive resin layer of the present disclosure may be formed by applying and drying a paste for a conductive resin layer, including a metal powder coated with a first organic material, a low-melting-point metal powder coated with a second organic material, and a base resin, to the body 110 and then performing a curing heat treatment thereon. The low-melting-point metal of the low-melting-point metal powder is partially melted during the drying and the curing heat treatment, and may form the first intermetallic compound 132$b$ with a portion of the metal particles disposed to surround the metal particle 132$a$. In this case, the low-melting-point metal may have a melting point of 300° C. or less.

In some embodiment, the low-melting-point metal comprises any metal having a melting point of 300° C. or less. As a more detailed example, the low-melting-point metal may comprise at least one selected from Sn, $Sn_{96.5}Ag_{3.0}Cu_{0.5}$, $Sn_{42}Bi_{58}$, and $Sn_{72}Bi_{28}$. In some embodiment, the metal particle 132$a$ comprises at least one of Cu or Ag. After the paste for a conductive resin layer is applied to the body 110, Sn is melted during the drying and the curing. The molten Sn included in the low-melting-point metal wets the metal particles having a higher melting point than the low-melting-point metal due to capillarity and reacts with a portion of the metal particles to form the first intermetallic compound 132$b$ such as $Ag_3Sn$, $Cu_6Sn_5$, $Cu_3Sn$, or the like. As illustrated in FIG. 3, Ag or Cu of the metal particle 132$a$, which is not used for the reaction to form the first intermetallic compound 132$b$, will remain in the form of metal particles 132$a$. In addition, even when the drying and curing processes are completed, apart of Sn included in the low-melting point powder, which is not used for the reaction to form the first intermetallic compound, may react with the plating layers 133 and 143 during a subsequent plating heat treatment to form the second intermetallic compound 132$d$. In addition, a part of the low-melting-point metal may be included in the first intermetallic compound even after the plating heat treatment.

The first intermetallic compound 132$b$ and/or the metal particles 132$a$ may serve to electrically connect the internal electrode 121 and the plating layer 133 to each other and to decrease equivalent series resistance (ESR).

Referring to FIGS. 2 and 3, an electrode layer 131 including a conductive metal and glass may be further disposed between the conductive resin layer 132 and the body 110. However, the present disclosure is not limited thereto, and the conductive resin layer 132 may be in direct contact with the body 110 to be directly connected to the internal electrode 121.

The base resin 132$c$ may include a thermosetting resin having electrical insulation characteristics.

In this case, the thermosetting resin may include, for example, an epoxy resin but the present disclosure is not limited thereto. For example, the thermosetting resin may include a bisphenol-A resin, a glycol epoxy resin, a novolac epoxy resin, or a resin having a low molecular weight, maintained in a liquid state at room temperature, among derivatives thereof.

The plating layer 133 is disposed on the conductive resin layer 132. In some embodiments, the plating layer 133 may include nickel (Ni).

An additional plating layer 134 may be disposed on the plating layer 133. Furthermore, the additional plating layer 134 may include at least one of tin (Sn), palladium (Pd), or alloys thereof, and may include a plurality of layers.

The second intermetallic compound 132$d$ is disposed on a boundary between the conductive resin layer 132 and the plating layer 133.

In general, after the conductive resin layer 132 is formed, the plating layer 134 is formed by using a metal, exposed on a surface of the conductive resin layer, as a seed. However, a portion of the metal used for forming the plating layer may be leached into the conductive resin layer 132 due to thermal impact such as soldering heat.

However, according to the present disclosure, since the second intermetallic compound 132d is formed on the boundary between the conductive resin layer 132 and the plating layer 133, adhesion strength between the conductive resin layer 132 and the plating layer 133 may be improved and a portion of the plating layer may be prevented from being leached to be lost due to the thermal impact such as soldering heat.

A method of forming the second intermetallic compound 132d is not necessarily limited. As a detailed example, as will be described later, the second intermetallic compound 132d may be formed while a plating layer is formed on a conductive resin layer after the conductive resin is formed using a paste for a conductive resin layer including a metal powder coated with a first organic material, a low-melting-point metal powder coated with a second organic material, and a base resin. For example, a low-melting-point metal of the low-melting-point metal powder may form the second intermetallic compound 132d during a plating heat treatment to form the plating layer.

Therefore, the first intermetallic compound 132b may be an intermetallic compound between the low-melting-point metal and the metal particle 132a, and the second intermetallic compound 132d may be an intermetallic compound between the low-melting-point metal and a metal included in the plating layer.

In some embodiments, when a Sn-based metal is used as the low-melting-point metal and Ni is used as the plating layer, the second intermetallic compound 132d may be a Ni—Sn intermetallic compound and, in more detail, $Ni_3Sn_4$. In addition, the second intermetallic compound 132d may be formed on a boundary between the first intermetallic compound 132c and the plating layer 133. In addition, a portion of the organic materials, coated on the metal powder and the low-melting-point metal powder, may be included in the second intermetallic compound 132d, such as Ni—Sn intermetallic compound.

Method for Manufacturing Electronic Component

Hereinafter, a method for manufacturing an electronic component according to another aspect of the present disclosure will be described in detail. However, descriptions overlapping those given in the electronic component will be omitted to avoid overlapping descriptions. In addition, a method for manufacturing a capacitor will be described as an example to describe an embodiment of the present disclosure. However, the present disclosure is not limited thereto, and it is noted that the method for manufacturing a capacitor may be applied to a method for manufacturing an electronic component provided with an external electrode including a conductive resin layer and a plating layer.

A method for manufacturing an electronic component according to another aspect of the present disclosure may include preparing a body including a dielectric layer and an internal electrode, applying and drying a paste for a conductive resin layer to and on the body and then performing a curing heat treatment to form a conductive resin layer, and plating a metal material on the conductive resin layer and then performing a plating heat treatment to form a plating layer. The paste for a conductive resin layer includes a metal powder coated with a first organic material, a low-melting-point metal powder coated with a second organic material, and a base resin.

Preparing Body

In the method for manufacturing an electronic component according to this embodiment, a slurry containing powder such as barium titanate ($BaTiO_3$), or the like, is coated on a carrier film and then dried to prepare a plurality of ceramic green sheets.

The plurality of ceramic green sheets may be prepared by mixing ceramic powder, a binder, and a solvent to prepare a slurry and molding the slurry into a sheet shape having a thickness of several micrometers (μm) using a doctor blade method.

A conductive paste for an internal electrode, including nickel powder or the like, may be applied to the ceramic green sheets using a screen-printing method to form internal electrodes. A printing method of the conductive paste may be a screen-printing method, a gravure printing method, or the like, but the present disclosure is not limited thereto.

A plurality of green sheets, on which an internal electrode is printed, are laminated to prepare a multilayer body. In this case, a plurality of green sheet, on which an internal electrode is not printed, may be laminated on upper and lower surfaces of the multilayer body to form a cover.

The multilayer body may be sintered to prepare a body including a dielectric layer and an internal body. In addition, referring to FIG. 3, a body 110 may be formed by alternately laminating a ceramic green sheet, on which a first internal electrode 121 is printed, and a ceramic green sheet, on which a second internal electrode 122 is printed, and then sintering the green sheets.

The preparing of the body may further include applying a paste for an electrode, including a conductive metal and a glass, to a sintering-completed body to form electrode layers 131 and 141.

Forming Conductive Resin Layer

A paste for a conductive resin layer may be applied and dried to the body 110, and a curing heat treatment may then be performed to form the conductive resin layers 132 and 142. When the electrode layers 131 and 141 are formed, the paste for a conductive resin layer may be applied to the electrode layers 131 and 141.

The paste for a conductive resin layer includes a metal powder coated with a first organic material, a low-melting-point metal powder coated with a second organic material, and a base resin. In this case, the low-melting-point metal may have a melting point of 300° C. or less.

For example, the paste for a conductive resin may be prepared by mixing Ag powder coated with the first organic material as the metal powder, Sn-based solder powder coated with the second organic material as the low-melting-point metal powder, and a thermosetting resin as the base resin and then distributing the paste using a 3-roll mill. The Sn-based solder powder may include at least one selected from Sn, $Sn_{96.5}Ag_{3.0}Cu_{0.5}$, $Sn_{42}Bi_{58}$, and $Sn_{72}Bi_{28}$, and a particle size of Ag included in the Ag powder may be 0.5 to 3 μm, but the present disclosure is not limited thereto.

The thermosetting resin may include, for example, an epoxy resin, but the present disclosure is not limited thereto. The thermosetting resin may be, for example, a bisphenol-A resin, a glycol epoxy resin, a novolac epoxy resin, or a resin having a low molecular weight, maintained in a liquid state at room temperature, among derivatives thereof.

In addition, when the paste for a conductive resin layer includes the metal powder coated with the first organic material, the low-melting-point metal powder coated with the second organic material, and a base resin, the metal materials included in the low-melting-point metal and the plating layer may form during a plating heat treatment a second intermetallic compound 132d on a boundary between the conductive resin layer 132 and the plating layer 133.

On the other hand, when a metal powder, not coated with an organic material, and a low-melting-point metal powder, not coated with an organic material, are used, most of the low-melting-point metal powder may be used to form a metal particle and the first intermetallic compound in drying and curing processes during formation of a conductive resin layer. Accordingly, even when a plating layer is formed on the conductive resin layer, the second intermetallic compound 132d may not be formed on the boundary between the conductive resin layer 132 and the plating layer 133 due to an insufficient amount of a low-melting-point metal reacting with a metal material of the plating layer to form an intermetallic compound.

In the present disclosure, since the metal powder coated with the first organic material and the low-melting-point metal powder coated with the second organic material are used, the first and second organic materials used for the coatings may partially suppress formation of the intermetallic compound even when subjected to the drying and curing processes during formation of the conductive resin layer. Therefore, a portion of the low-melting-point metal may remain in the state in which the low-melting-point metal does not form the first intermetallic compound 132b. The remaining portion of the low-melting-point metal may react with the metal material of the plating layer to form the second intermetallic compound 132d during a subsequent plating heat treatment. Thus, adhesion strength between the conductive resin layer 132 and the plating layer 133 may be improved, and a portion of the plating layer may be prevented from being leached to be lost due to thermal impact such as soldering heat.

In this case, each of the first and second organic materials may be a fatty acid-based organic material. This is because in the case of a fatty acid-based organic material, the metal included in the low-melting-point metal and nickel (Ni) included in the plating layer may more easily form an intermetallic compound during a plating heat treatment.

As a more detail example, the fatty acid-based organic material may include stearic acid, oleic acid, or derivatives thereof.

The first and second organic materials may be the same. However, the present disclosure is not limited thereto, and the first and second organic materials may be different from each other.

Forming Plating Layer

Plating layers 133 and 143 may be formed by plating a metal material on the conductive resin layers 132 and 142 and then performing a plating heat treatment.

For example, in a method of forming plating layers, Ni plating layers 133 and 143 may be formed by plating Ni by electrolytic plating using the metal, exposed to the surfaces of the conductive resin layers 132 and 142, as a seed and performing a plating heat treatment. In this case, the plating heat treatment is not necessarily limited. For example, the plating heat treatment may be performed at temperature of 120 to 200 degrees Celsius, performed in a nitrogen ($N_2$) atmosphere, and performed for about 10 to 14 hours.

As described above, the low-melting-point metal of the conductive resin layer and the metal material of the plating layer may form the intermetallic compound to provide the second intermetallic compound 132d and 142d (not illustrated) on a boundary between the conductive resin layer 132 and the plating layer 133 and a boundary between the conductive resin layer 142 and the plating layer 143. In this case, the metal material of the plating layer may be Ni, and the second intermetallic compound may be a Ni—Sn intermetallic compound.

In addition, an operation of forming additional plating layers 134 and 144 on the plating layers 133 and 143 may be further performed. For example, an operation of plating Sn on the plating layers 133 and 143 to form a Sn plating layer may be performed.

Example

As an inventive example, a conductive resin layer was performed by mixing Ag powder coated with stearic acid, Sn solder powder coated with stearic acid, and an epoxy resin, applying and drying a paste distributed using a 3-roll mill on a body, and then performing a curing heat treatment. Then, a Ni plating layer was formed by plating Ni on the conductive resin layer using an electrolytic plating method and performing a plating treatment at temperature of 160 degrees Celsius in a nitrogen atmosphere for 12 hours.

As a comparative example, a conductive resin layer was formed by mixing Ag powder not coated with an organic material, Sn solder powder not coated with an organic material, and an epoxy resin, applying and drying a paste distributed using a 3-roll mill on a body, and then performing a curing heat treatment. Then, a Ni plating layer was formed by plating Ni on the conductive resin layer using an electrolytic plating method and performing a plating treatment at temperature of 160 degrees Celsius in a nitrogen atmosphere for 12 hours.

A solder heat resistance and a drop test were performed on the inventive example and the comparative example, and results of the tests were listed in Table 1 and Table 2, respectively.

In the solder heat resistance test, 100 samples of each of the inventive example and the comparative example were prepared and treated at temperature of 85 degrees Celsius and a relative humidity of 85% for 6 hours, and then deposited in a solder bath of 280 degrees Celsius for 10 seconds. These processes were performed as many as the number of repetitions listed in Table 1, and the number of samples, in which a plating layer was lost, were listed in Table 1. In this case, a case in which 10% or more of a plating layer was lost was determined to be a lost sample.

In the drop test, 100 samples of each of the inventive example and the comparative examples were prepared and dropped at a height of 1 meter from the ground, and the number of samples, in which a plating layer and a conductive resin layer were separated from each other, were then listed in Table 2.

In addition, in each of the inventive example and the comparative example, a cross section taken in a length and thickness (L-T) direction, cut through a central portion of a body in a width direction, was analyzed using a scanning electron microscope (SEM) and an energy dispersive X-Ray spectrometer (EDS) to confirm whether a nickel-tin (Ni—Sn) intermetallic compound was present on a boundary between a conductive resin layer and a Ni plating layer.

TABLE 1

| Classification | Number of Repetitions | |
| --- | --- | --- |
| | 9 | 12 |
| Inventive Example | 0/100 | 0/100 |
| Comparative Example | 4/100 | — |

TABLE 2

| Classification | Number of Repetitions | |
| --- | --- | --- |
| | 10 | 50 |
| Inventive Example | 0/100 | 0/100 |
| Comparative Example | 0/100 | 5/100 |

As can be seen from Table 1 and Table 2, in the inventive example, solder heat resistance was excellent and adhesion strength between the conductive resin layer and the Ni plating layer was excellent.

Meanwhile, in the comparative example, plating layers of four samples, among 100 samples, were lost to deteriorate solder heat resistance when a solder heat resistance test was repeated nine times. In addition, when the number of repetitions of the drop test reaches 50, a plating layer and a conductive resin layers were separated from each other to deteriorate adhesion strength in five samples among the 100 samples.

In the sample chips of the inventive example on which a solder heat resistance test was performed repeatedly 12 times, when ESR changes before and after a solder heat resistance test were measured, it was confirmed that ESR was increased up to 6.54% and an ESR increase rate was low.

On the other hand, in the sample chips of the comparative example on which a solder heat resistance test was performed repeatedly 9 times, when ECR changes before and after the solder heat resistance test were measured, it was confirmed that ESR was increased up to 123% and an ESR increase rate was significantly high.

In each of the inventive example and the comparative example, a cross section taken in a length and thickness (L-T) direction, cut through a central portion of a body in a width direction, was analyzed using a scanning electron microscope (SEM) and an energy dispersive X-Ray spectrometer (EDS) to confirm whether a nickel-tin (Ni—Sn) intermetallic compound was present on a boundary between a conductive resin layer and a Ni plating layer.

Figure 5:
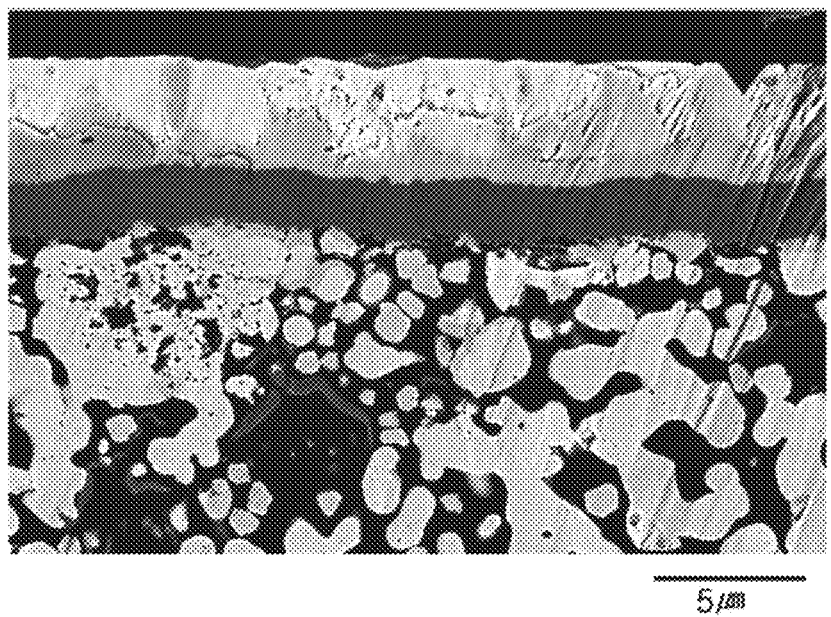
FIG. 5 is an image, captured by a scanning electron microscope (SEM), illustrating a cross section of an external electrode according to an inventive example.
Figure 6:
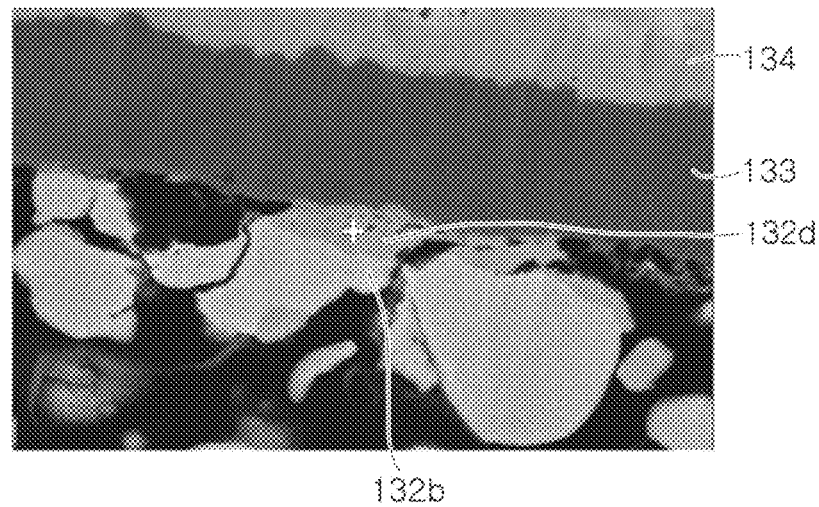
FIG. 6 is an enlarged view of a boundary portion between a Ni plating layer and a conductive resin layer in FIG. 5.
Figure 7:
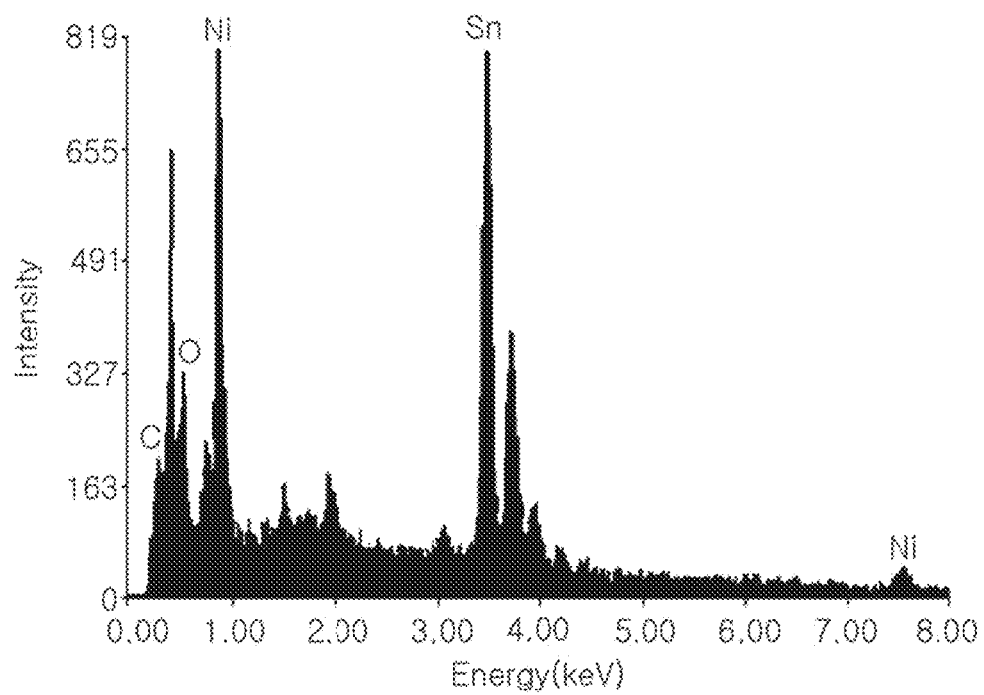
FIG. 7 illustrates a result of analyzing a '+' portion in FIG. 6 using an energy dispersive X-ray spectrometer (EDS).

FIG. 5 is an image, captured by a scanning electron microscope (SEM), illustrating a cross section of an external electrode according to an inventive example. FIG. 6 is an enlarged view of a boundary portion between a Ni plating layer and a conductive resin layer in FIG. 5. FIG. 7 illustrates a result of analyzing a '+' portion in FIG. 6 using an energy dispersive X-ray spectrometer (EDS).

As a result of analyzing a graph of FIG. 7, a '+' portion included, by mass ratio, 2.7 wt % of carbon (C), 4.59 wt % of oxygen (O), 27.27 wt % of nickel (Ni), and 65.44 wt % of tin (Sn), and included, by atomic weight ratio, 14.74 at % of C, 18.77 at % of 0, 30.40 at % of Ni, and 36.09 at % of Sn. Accordingly, it is confirmed that the second intermetallic compound 132d disposed on the boundary between the conductive resin layer 132 and the Ni plating layer 133 was $Ni_3Sn_4$, a Ni—Sn intermetallic compound.

Figure 8:
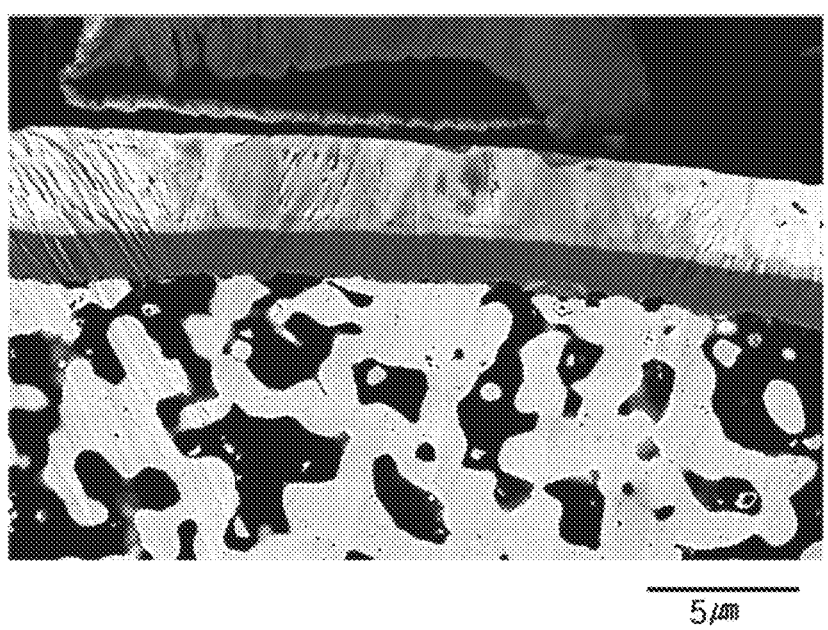
FIG. 8 is an image, captured by a scanning electron microscope (SEM), illustrating a cross section of an external electrode according to a comparative example.

FIG. 8 is an image, captured by a scanning electron microscope (SEM), illustrating a cross section of an external electrode according to a comparative example. As can be seen from FIG. 8, a second intermetallic compound was not observed.

Accordingly, it is confirmed that when the second intermetallic compound 132d is formed on the boundary between the conductive resin layer 132 and the plating layer 133 according to the present disclosure, adhesion strength between the conductive resin layer 132 and the plating layer 133 may be improved and a portion of the plating layer may be prevented from being leached to be lost due to thermal impact such as soldering heat.

As described above, according to the present disclosure, a first intermetallic compound may be included in a conductive resin layer to improve high-temperature load and moisture resistance characteristics.

In addition, a second intermetallic compound may be disposed on a boundary between a conductive resin layer and a plating layer to improve adhesion strength between the conductive resin layer and the plating layer.

While embodiments have been shown and described above, it will be apparent to those skilled in the art that modifications and variations could be made without departing from the scope of the present disclosure as defined by the appended claims.

What is claimed is:

1. An electronic component comprising:
a body including a dielectric layer and an internal electrode; and
an external electrode including a conductive resin layer, disposed on the body, and a plating layer disposed on the conductive resin layer,
wherein the conductive resin layer includes a metal particle, a first intermetallic compound, and a base resin, and
a second intermetallic compound is disposed on a boundary between the conductive resin layer and the plating layer,
wherein the second intermetallic compound is disposed on a boundary between the first intermetallic compound and the plating layer.

2. The electronic component of claim 1, wherein the first intermetallic compound comprises an intermetallic compound having a solid state between an element of a low-melting-point metal and an element of the metal particle, and
the second intermetallic compound comprises an intermetallic compound having a solid state between an element of the low-melting-point metal and a metal included in the plating layer.

3. The electronic component of claim 2, wherein the low-melting-point metal has a melting point of 300° C. or less.

4. The electronic component of claim 2, wherein the low-melting-point metal includes at least one selected from Sn, $Sn_{96.5}Ag_{3.0}Cu_{0.5}$, $Sn_{42}Bi_{58}$, and $Sn_{72}Bi_{28}$.

5. The electronic component of claim 1, wherein the metal particle includes at least one of Ag or Cu, and
the first intermetallic compound includes at least one of $Ag_3Sn$, $Cu_6Sn_5$, or $Cu_3Sn$.

6. The electronic component of claim 1, wherein the second intermetallic compound comprises a Ni—Sn intermetallic compound.

7. The electronic component of claim 1, wherein the second intermetallic compound is comprised of a material different than the first intermetallic compound.

8. The electronic component of claim 1, wherein an electrode layer, including a conductive metal and a glass, is additionally disposed between the conductive resin layer and the body.

9. The electronic component of claim 1, further comprising:
an additional plating layer disposed on the plating layer.

10. A method for manufacturing an electronic component, the method comprising:
preparing a body including a dielectric layer and an internal electrode;

applying a paste for a conductive resin layer to the body, drying the applied paste, and then performing a curing heat treatment to form a conductive resin layer; and plating a metal material on the conductive resin layer, and then performing a plating heat treatment to form a plating layer, wherein the paste for a conductive resin layer includes a metal powder coated with a first organic material, a low-melting-point metal powder coated with a second organic material, and a base resin.

11. The method of claim 10, wherein each of the first and second organic materials includes a fatty acid-based organic material.

12. The method of claim 10, wherein the low-melting-point metal has a melting point of 300° C. or less.

13. The method of claim 10, wherein the low-melting-point metal includes at least one selected from Sn, $Sn_{96.5}Ag_{3.0}Cu_{0.5}$, $Sn_{42}Bi_{58}$, and $Sn_{72}Bi_{28}$.

14. The method of claim 10, wherein the conductive resin layer includes a metal particle, a first intermetallic compound, and a base resin, and a second intermetallic compound is formed on a boundary between the conductive resin layer and the plating layer after the plating the metal material.

15. The method of claim 14, wherein the first intermetallic compound comprises an intermetallic compound between the low-melting-point metal and the metal particle, and the second intermetallic compound comprises an intermetallic compound between the low-melting-point metal and a metal included in the plating layer.

16. The method of claim 10, wherein the preparing the body further comprises applying a paste for an electrode layer, including a conductive metal and a glass, on the body to form an electrode layer.

17. An electronic component comprising:

a body including a dielectric layer and an internal electrode; and an external electrode including a conductive resin layer, disposed on the body, and a plating layer disposed on the conductive resin layer, wherein the conductive resin layer includes a metal particle, a first intermetallic compound, and a second intermetallic compound, the second intermetallic compound is disposed between the conductive resin layer and the plating layer, and the metal particle is disposed in the first intermetallic compound.

18. The electronic component according to claim 17, wherein the conductive resin layer further includes a base resin, and the first intermetallic compound comprises an intermetallic compound having a solid state between an element of a low-melting-point metal and an element of the metal particle.

19. The electronic component according to claim 17, wherein the second intermetallic compound comprises an intermetallic compound having a solid state between an element of the low-melting-point metal and a metal included in the plating layer.

20. The electronic component of claim 17, wherein the second intermetallic compound comprises a Ni—Sn intermetallic compound.

* * * * *